(12) United States Patent
De Luca et al.

(10) Patent No.: US 9,950,357 B2
(45) Date of Patent: Apr. 24, 2018

(54) CONVEYING DEVICE OF ROLLED BARS EXITING FROM A CUTTING SHEAR, CUTTING MACHINE AND CUTTING PROCESS THEREOF

(71) Applicant: Danieli & C. Officine Meccaniche S.p.A., Buttrio (IT)

(72) Inventors: Andrea De Luca, Remanzacco (IT); Matteo Nobile, Ruda (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 0 days.

(21) Appl. No.: 14/763,117

(22) PCT Filed: Jan. 23, 2014

(86) PCT No.: PCT/IB2014/058490
§ 371 (c)(1),
(2) Date: Jul. 23, 2015

(87) PCT Pub. No.: WO2014/115097
PCT Pub. Date: Jul. 31, 2014

(65) Prior Publication Data
US 2015/0343515 A1    Dec. 3, 2015

(30) Foreign Application Priority Data

Jan. 24, 2013  (IT) .............................. MI2013A0107

(51) Int. Cl.
*B21D 43/28* (2006.01)
*B65G 11/20* (2006.01)
*B23D 25/12* (2006.01)
*B23D 33/02* (2006.01)

(52) U.S. Cl.
CPC ......... *B21D 43/285* (2013.01); *B21D 43/282* (2013.01); *B23D 25/12* (2013.01);
(Continued)

(58) Field of Classification Search
CPC ........ B21B 15/0007; B21B 2015/0014; B21B 39/18; B23D 33/02; B23D 25/12;
(Continued)

(56) References Cited

U.S. PATENT DOCUMENTS 3,823,633 A * 7/1974 Ross ........................ B26D 7/20
144/221
3,834,260 A * 9/1974 Sieurin ................... B21B 39/18
83/106

(Continued)

FOREIGN PATENT DOCUMENTS

DE      2626476 A1 * 12/1977 ............. B21B 39/18
EP      0297313       1/1988
(Continued)

*Primary Examiner* — Jennifer Swinney
(74) *Attorney, Agent, or Firm* — Stetina Brunda Garred & Brucker

(57) ABSTRACT

A conveying device (4) for conveying rolled bar segments, continuously exiting from a cutting shear (3), comprising at least two conveying channels (10, 11) for conveying the bar segments; at least one separation wall (8) separating a first conveying channel (10) from a second conveying channel (11); and at least one fixed partition (9), provided below the wall (8) and which separates the first channel (10) from the second channel (11); the fixed partition (9) is configured so that, at speed, when a rolled bar is deviated to pass from a direction towards the first channel to a direction towards the second channel, the tail of a first bar segment (30) advances in the first channel (10) by passing below the fixed partition (9), while the head of a second bar segment (31) after the first segment (30) advances in the second channel by passing above the fixed partition.

13 Claims, 5 Drawing Sheets

(52) U.S. Cl.
CPC ............ B23D 33/02 (2013.01); B65G 11/203 (2013.01); *Y10T 83/0448* (2015.04); *Y10T 83/2209* (2015.04)

(58) Field of Classification Search
CPC ............. Y10T 83/2083; Y10T 83/2085; Y10T 83/4714; Y10T 83/9396; Y10T 83/9469; Y10T 83/9408; B21D 43/285; B21D 43/282; B65G 11/023
See application file for complete search history.

(56) References Cited

U.S. PATENT DOCUMENTS

| | | | | |
|---|---|---|---|---|
| 4,176,535 A | * | 12/1979 | Elsner | B23D 33/02 72/203 |
| 4,406,198 A | * | 9/1983 | Pechau | B23D 25/12 83/170 |
| 4,966,060 A | * | 10/1990 | Poloni | B21B 39/18 83/105 |
| 5,040,440 A | * | 8/1991 | Harvey | B21B 39/18 209/657 |
| 6,082,237 A | * | 7/2000 | Bollig | B23D 33/02 83/105 |
| 2012/0198978 A1 | * | 8/2012 | Shen | B23D 33/02 83/78 |

FOREIGN PATENT DOCUMENTS

| | | | | |
|---|---|---|---|---|
| EP | 2821153 A1 | * | 1/2015 | ......... B21B 15/0007 |
| WO | WO9948638 | | 9/1999 | |

\* cited by examiner

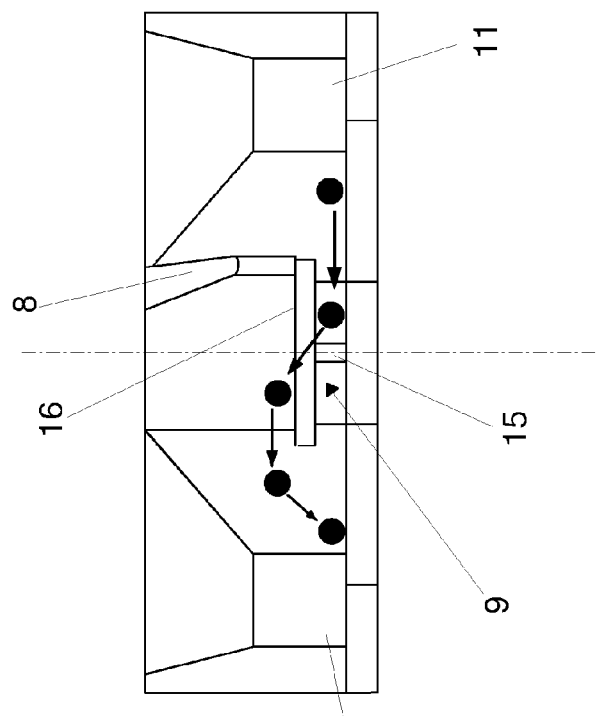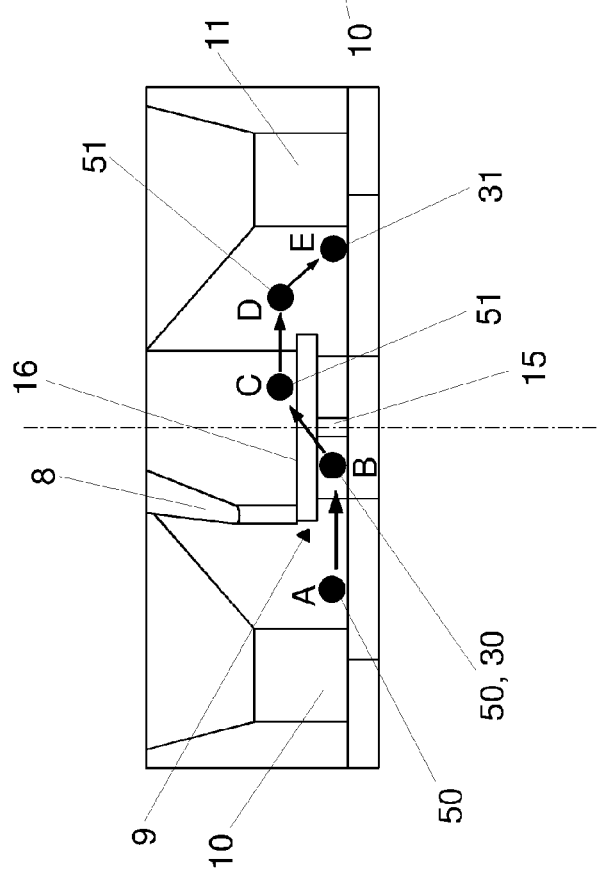

CONVEYING DEVICE OF ROLLED BARS EXITING FROM A CUTTING SHEAR, CUTTING MACHINE AND CUTTING PROCESS THEREOF

CROSS REFERENCE TO RELATED APPLICATIONS

The present application claims priority to PCT International Application No. PCT/IB2014/058490 filed on Jan. 23, 2014, which application claims priority to Italian Patent Application No. MI2013A000107 filed Jan. 24, 2013, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a conveying device for rolled bars exiting from a cutting shear, to a cutting machine comprising the conveying device and the cutting shear itself, and to a method for size cutting rolled bars.

STATE OF THE ART

Various cutting machines provided with flying shears are known in the prior art and are used in metallurgy for size cutting bars exiting from the rolling mill.

Some of said flying shears, before continuously size cutting, eliminate the head of the rolled material and after continuously size cutting also eliminate the tail of the rolled material because said end parts normally have unacceptable geometric deformations and/or inclusions of polluting particles. A shear of this type is described in US 2012/198978 A1. It is also known that the first or last bar may be cut into pieces in order to obtain samples for the necessary tests.

Among the known shears, the flying shears employing contra-rotating blades mounted on blade holder drams have been proven to be the most suitable also for cutting bars travelling at high speed. Said shears comprise at least one counterpoised pair of contra-rotating drums, each circumferentially fitting an equal number of blades.

For example, WO9948638 discloses a shear with a plurality of blades, positioned so as to be each adapted to carry out given type of cut: right size cut, left size cut, right scrapping cut, left scrapping cut etc.

In the shears of the prior art, however, due to the high speed of the rolled product, problems of jamming often arise caused by the fact that the head of the newly cut bar must be addressed into the correct exit channel, which is generally different from the channel in which the previous bar was running. The channel is selected by a switching device which is upstream of the shear: the switching device makes the rolling mill pass from a first position to a second position, and the rolled product is cut between said two positions so that the tail of the first bar can continue in a first channel, while the head of the second bar proceeds in a second channel. Above all, however, the tails of the bars often knock into the walls of the channels with the risk of the bars being damaged and permanently deformed.

Such issues are amplified as the speed of the bars increases. The taster the rolled product the less rime for the head to pass the dividing wall and change channel, and the greater the knocks of the tail onto the walls of the channel.

In order to be able to increase the speed of the bars, the tendency is to move the dividing wall of the two channels away from the surface, transversal to the shear, on which the rolled product is cut. This solution in all cases implies less accuracy and the tail of the bar, which is not guided, knocks repeatedly and violently against the walls of the channels, often determining a hook-shaped deformation, which causes jamming further along the line.

It is thus felt the need to make a conveying device and a cutting machine thereof which allows to overcome the aforesaid drawbacks.

SUMMARY OF THE INVENTION

It is the main object of the present invention to provide a conveying device of rolled bars exiting from a continuous cutting shear, which allows to limit jamming and system downtime also at high rolling speed.

Another object of the invention is to provide a conveying device which allows to increase the quality of the bars made, limiting the number of faults.

A further object of the invention is to provide a rolled bar continuous cutting machine and a size cutting process thereof, which allows to obtain a high efficiency also at rolling speed higher than 150 m/s.

The present invention thus suggests to reach the objects discussed about by making a conveying device for rolled bar segments exiting from a continuous cutting shear, which according to claim 1 comprises:
- at least two conveying channels for conveying the bar segments,
- at least one separation wall for separating a first conveying channel from a second conveying channel,
- and at least one fixed partition, provided below said at least one separation wall and which separates said first conveying channel from said second conveying channel,
- wherein said at least one fixed partition is configured so that, at operating speed, when a rolled bar is deviated to pass from a direction towards the first conveying channel to a direction towards the second conveying channel, the tail of a first bar segment cut by the shear advances in the first conveying channel by passing below said fixed partition, while the head of a second bar segment cut after the first segment advances in the second conveying channel by passing above said fixed partition.

Another aspect of the invention, relates to a continuous cutting machine of rolled bars exiting from a rolling mill into bar segments which according to claim 8 comprises:
- the aforesaid conveying device;
- a cutting shear, arranged upstream of said conveying device, for cutting a rolled bar into bar segments;
- a switching device, arranged upstream of said cutting shear, for alternately switching the trajectory of the rolled bar to be cut from a direction towards a first conveying channel to a direction towards a second conveying channel.

A further aspect of the invention relates to a size cutting process of roiled bars, which may be implemented by means of the aforesaid cutting machine, which according to claim 12 comprises the following steps of:
- providing a first head of a rolled bar advancing in a first conveying channel;
- performing a first switching of the rolled bar, by means of the switching device, from a first direction towards the first conveying channel to a second direction towards a second conveying channel;

performing a first size cut of the roiled bar at the blades of the cutting shear in the passage from said first direction to said second direction, thus defining a first bar segment and a second head of the rolled bar;

wherein, after the first size cut, the tail of the first bar segment advances in the first conveying channel by passing below a feed partition, while the second head of the rolled bar advances in the second conveying channel by passing above said fixed partition.

In particular, the cutting machine provided with the converter device object of the present invention has the following advantages:

it allows to adopt rolling speeds also higher than 150 m/s-avoiding jamming;

it allows to limit the faults on bars caused by shocks occurring during the step of channeling after cutting.

The dependent claims describe preferred embodiments of the invention.

BRIEF DESCRIPTION OF THE FIGURES

Further features and advantages of the present invention will be apparent in the light of the detailed description of a preferred, but not exclusive, embodiment of a device for conveying roiled bars exiting from a continuous cutting shear, illustrated by way of non-limitative example, with reference to the accompanying drawings, in which:

FIG. 4 is a diagram of the passage of the rolled product from a first channel to a second channel of the conveying device;

FIG. 5 is a diagram of the passage of the rolled product from a second channel to a first channel of the conveying device;

The same reference numbers in the figures identify the same elements.

DETAILED DESCRIPTION OF PREFERRED EMBODIMENTS OF THE INVENTION

Figure 1:
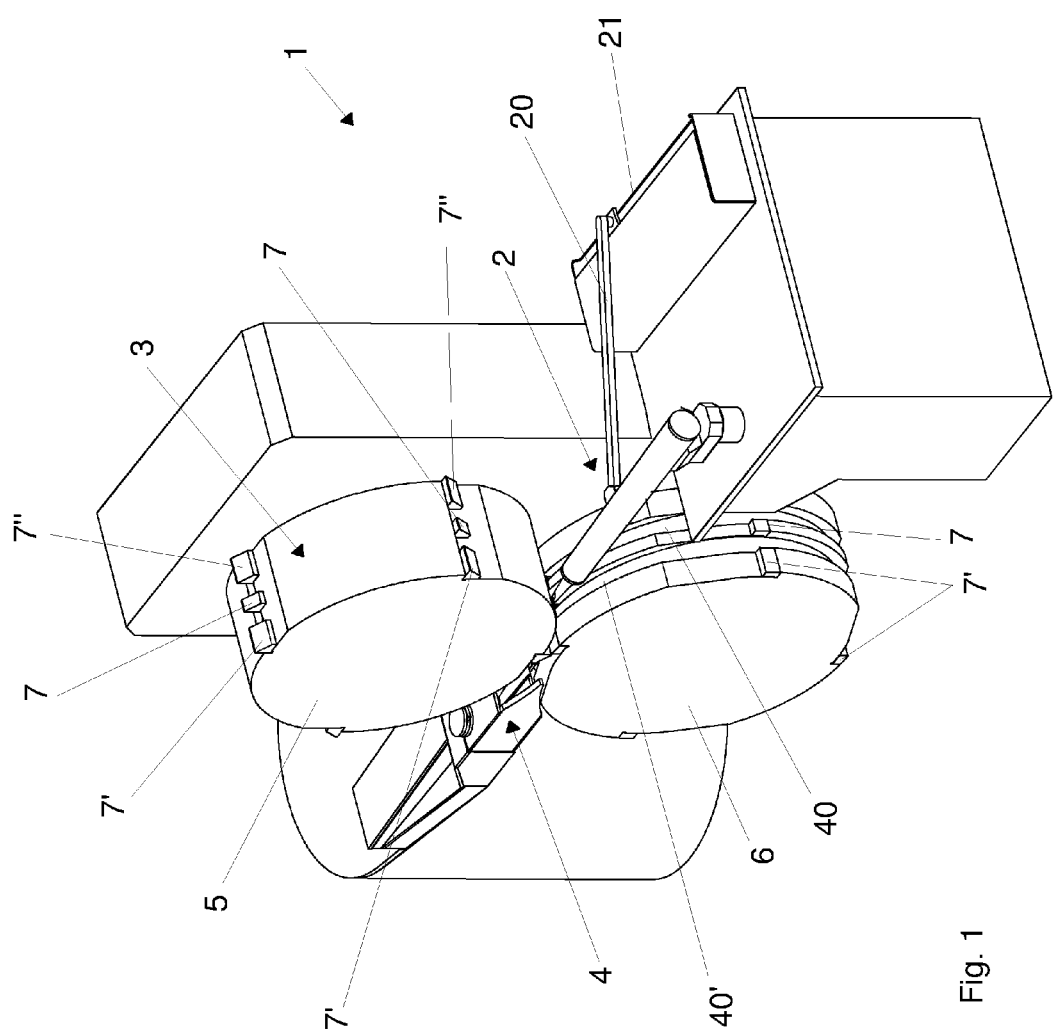
FIG. 1 is a perspective view of a cutting machine comprising a conveying device according to the invention.

The figures show a cutting machine for continuously cutting rolled bars into bar segments, indicated by numeric reference 1 as a whole.

Such a cutting machine 1, arranged downstream of a rolling mill (not shown), includes in sequence:

a switching device 2 for switching the path of the rolled bar exiting from the last rolling stand of the said rolling mill alternatively rightwards or leftwards;

a cutting shear 3, comprising two blade holder drums 5, 6 on which at least one series of blades 7 for size cutting bar segments is fitted;

a conveying device 4 for conveying the bar segments exiting from said shear 3 into respective conveying channels.

In a first preferred embodiment of the invention, the conveying device 4 of the bar segments, comprises:

two conveying channels 10, 11 for conveying the bar segments, arranged next to one another at a same vertical height, a separation wall 8 for separating a first conveying channel 10 from a second conveying channel 11, a fixed partition 9, provided below said wall 8 and which also separates said first conveying channel 10 from said second conveying channel 11.

Advantageously, the fixed partition 9 is fixed to a base surface common to the conveying channels and is thus interposed between the base surface common to the conveying channels and the separation wall 8. The fixed partition 9 defines two longitudinal cavities with said common base surface, and is configured so that, at operating speed, when a rolled bar is deviated by means of the switching device 2 to pass from a direction towards the first conveying channel 10 to a direction towards the second conveying channel 11, the tail of a first bar segment 30 advances in the first conveying channel 10 by passing below said fixed partition 9, while the head of a second bar segment 31, cut after the first segment 30, advances in the second conveying channel 11 by passing above said fixed partition 9, or vice versa.

In a preferred variant the fixed partition 9 has a T-shaped cross section. In particular (FIGS. 3, 4, 5), the fixed partition 9 has a first bulkhead 15, which is transversal, preferably perpendicular, to a base surface in common to the first and second conveying channel 10, 11, and a second bulkhead 16 arranged above and essentially perpendicular to said first bulkhead 15.

The longitudinal extension of the bulkheads 15, 16, along the conveying channels, is essentially equal to the longitudinal extension of the separation wall 8.

At operating speed, gradually as the shear 3 continuously cuts the bar segments, the tail of the first bar segment 30 continues to advance in the first channel 10 initially passing under said second bulkhead 16 of the fixed partition 9, i.e. in a first cavity of the partition, while the head of the second bar segment 31 advances in the second channel 11 initially passing over said second bulkhead 16 to then move and reach the base surface of said second channel 11. After the cut which defines the tail of the second bar segment 31, the tail of the second bar segment 31 advances into the second channel 11 initially passing under the second bulkhead 16 of the fixed partition 9, i.e. in a second cavity of the partition, while the head of a third bar segment advances in the first channel 10 initially passing over said second bulkhead 16 to then move and reach the base surface of said first channel 10.

The cutting shear 3, in this first embodiment consists of two blade holder drums 5, 6 on which a single series or central row of blades 7 for size cutting bar segments is arranged. The fixed partition 9 and the wall 8 are advantageously arranged at the cutting surface of said series of blades 7, preferably arranged essentially along a middle plane of the shear 3 containing the rolling axis of the rolling mill upstream of the switching device 2.

The size cutting blades 7 are shaped and arranged geometrically in the drums 5, 6 so as to direct the cut end of the rolled bar, i.e. the head of the new bar segment, upwards so that said head of the new bar segment reaches over the wall 16 of the partition 9. This is obtained also by virtue of the presence of switching cams 14, provided on the lower blade holder drum 6, near the size cutting blades 7.

In an advantageous variant of the invention, the separation wall 8 is moveable, being hinged on an end thereof to rotate by a predetermined angle in either one direction or the other over said second partition 16, so as to enlarge the mouth section of the conveying channel which will, receive the next bar segment.

Figure 2:
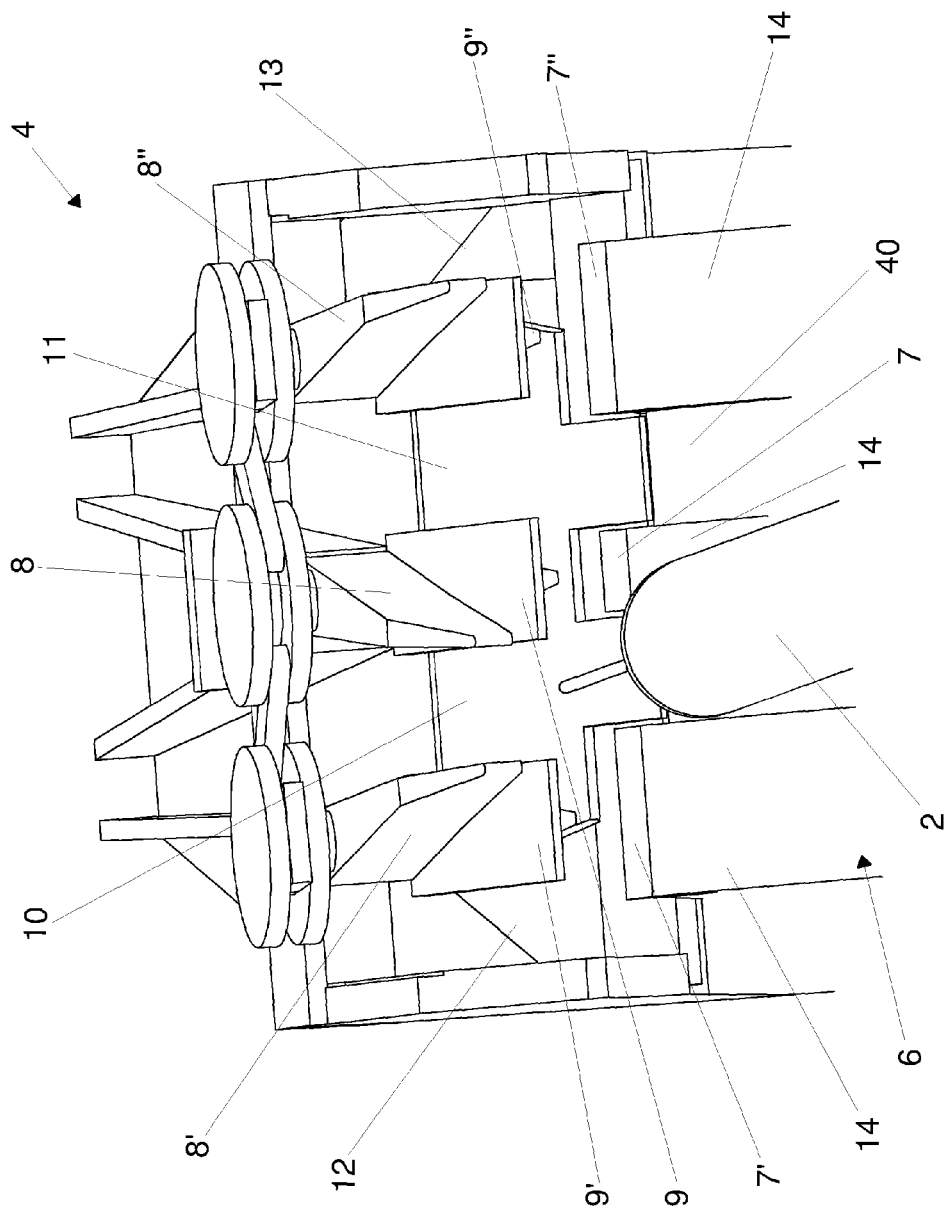
FIG. 2 is a partial view of the conveying device in a first operating position.
Figure 3:
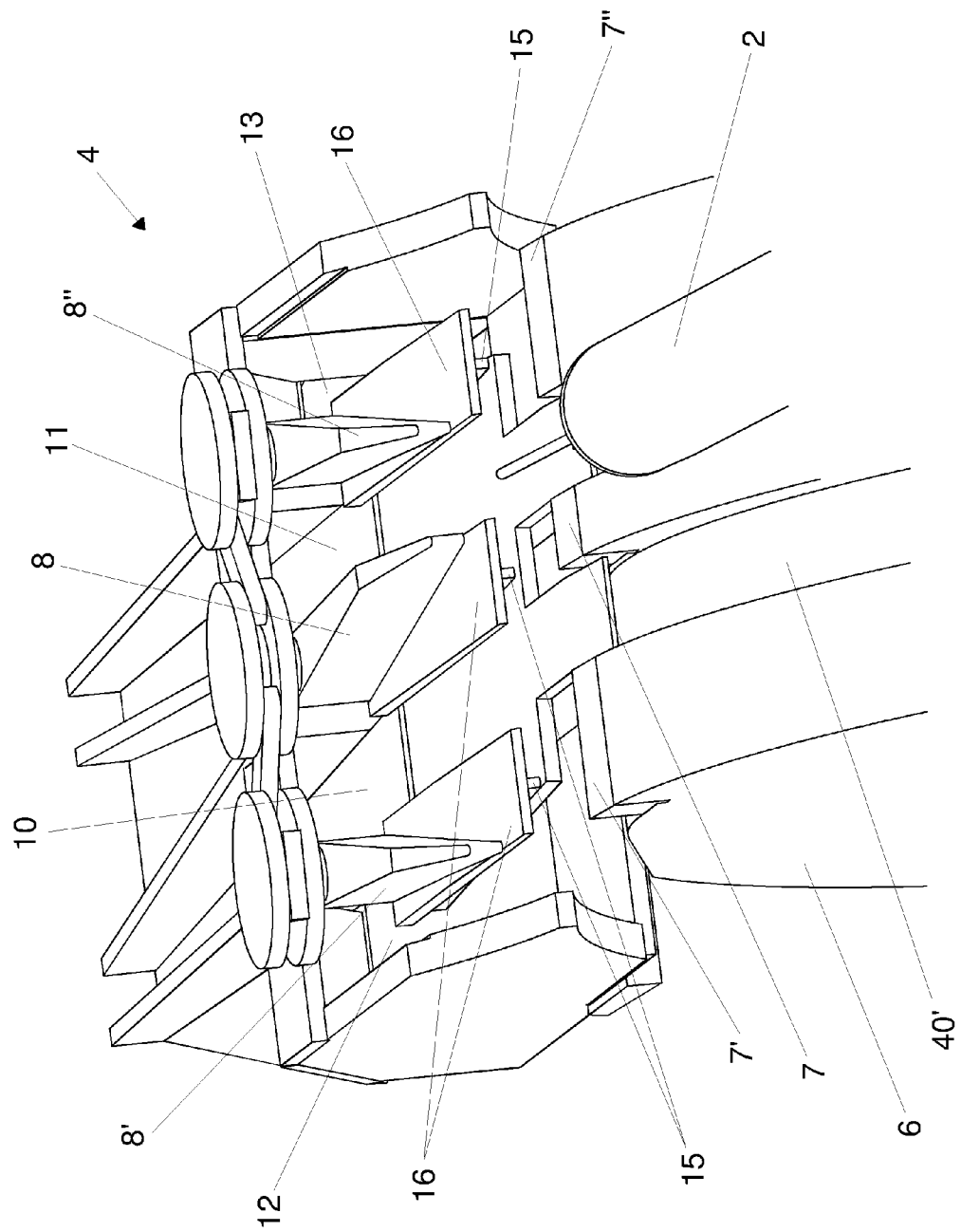
FIG. 3 is a partial view of the conveying device in a second operating position.

In a second preferred embodiment of the invention, shown in greater detail in FIGS. 2 and 3, the conveying device 4 of the bar segments comprises:

four conveying channels 10, 11, 12, 13 of the bar segments, arranged next to one another at a same vertical height, three separation walls 8, 8', 8", each wall respectively separating one conveying channel from the adjacent one;

three fixed separation partitions 9, 9', 9", each fixed partition being arranged under a respective wall 8, 8', 8", which may be advantageously moveable, also separating a conveying channel from the adjacent one.

Advantageously, each fixed partition 9, 9', 9" is configured so that, at operating speed, when a rolled bar is deviated to pass from a direction towards the first conveying channel to a direction towards the second conveying channel, the tail of a first bar segment cut by the shear advances in the first conveying channel by passing below the fixed partition 9, while the head of a second bar segment cut after the first segment advances in the second conveying channel by passing above said fixed partition or vice versa.

Each fixed partition 9, 9', 9" has a T-shaped cross section having a first, partition 15, which is transversal, preferably perpendicular, to the respective base surface common to the two adjacent conveying channels separated by the same partition and a second partition 16 arranged over and essentially perpendicular to said first partition 15.

At operating speed, gradually as the shear 3 continuously cuts the bar segments, the tail of the first bar segment advances in the first channel passing under said second bulkhead 16, i.e. in a first cavity of the partition, while the head of the second bar segment advances in the second channel adjacent to the first, initially passing over said second bulkhead 16 to then move and reach the base surface of said second channel. After the cut which defines the tail of the second bar segment, the tail of the second bar segment advances into the second channel passing under the second bulkhead 16, i.e. in a second cavity of the partition, while the head of a third bar segment advances in the first channel initially passing over said second bulkhead 16 to then move and reach, the base surface of said first channel.

The cutting shear 3, in this second embodiment, consists of two blade holder drums 5, 6 on which three series or rows of blades are arranged. A first series of blades 7, for size cutting the bar segments is fitted centrally on the drums 5, 6; a second series of blades 7' and a third series of blades 7" for the scrap cutting or trimming of the head and tail are provided by the two sides of said first series.

The blades 7, 7', 7" of each series are positioned at an equal distance from one another along the circumference of the respective drum. In the non-limitative example in FIG. 1, there are four blades 7, four blades 7' and four blades 7" on each drum 5, 6.

All blades 7, 7', 7" are shaped and arranged geometrically on the drums 5, 6 so as to direct the cut end of the rolled bar, i.e. the head of the new bar segment, upwards so that said head of the new bar segment will reach over the bulkhead 16 of the corresponding partition 9, 9', 9". This is obtained also by virtue of the presence of switching cams 14, provided on the lower blade holder drum 6, near the size cutting blades 7 and near the scrapping cat blades 7', 7".

At least the lower drum 6 of the cutting shear 3 is provided with a transit space or groove 40, 40', without blades, where the rolled bar passes without coming into contact with the blades for the entire length of the rolled bar which must be size cut between the cylindrical central zone, comprising the first series of blades 7, and the respective cylindrical side zones, comprising the side series of blades 7' and 7". When size cutting at operating speed, as soon as the rolled bars has crossed the required length of one of the transit grooves 40, it is deviated by the switching device 2 and passes firstly into the cylindrical central zone to be size cut by means of blades 7 and then into the other transit groove 40', and vice versa. A bar segment of the required length is cut from the rolled bar at each passage through the cylinder central zone.

The fixed partition 9 and the respective wall 8 are arranged at the first central series of blades 7, i.e. are arranged essentially along a middle plane of the shear 3 containing the rolling axis of the rolling mill. The fixed partition 9 and the respective wall 8 separate the conveying channel 10 for size cutting bar segments from the conveying channel 11, also used to convey size cut bar segments.

The fixed partition 9' and the respective wall 8' are arranged at the second series of blades 7', i.e. are arranged essentially along a first plane parallel to said middle plane of the shear 3. The fixed partition 9' and the respective wall 8' separate the conveying channel 10 for the size cut bar segment from the conveying channel 12 used for conveying bar segments or pieces of bar to be scrapped, such as for example, the first and the last segment of the rolled bar.

The fixed partition 9" and the respective wall 8" are arranged at the third series of blades 7", i.e. are arranged essentially along a second plane parallel to said middle plane of the shear 3. The fixed partition 9' and the respective wall 8' separate the conveying channel 11 for the size cut bar segments from the conveying channel 13 also to convey bar segments or pieces be scrapped.

The blades 7, 7' and 7" all operate on the same cutting plane.

The conveying channels 10 and 11 are arranged centrally in the conveying device 7.

The conveying channel 12 is instead arranged by the side of the conveying channel 10, while the conveying channel 13 is arranged by the side of the conveying device 11.

The separation walls 8, 8', 8" if advantageously moveable, are hinged by an end thereof to rotate by a predetermined angle in either one direction or the other over the respective second bulkhead 16, so as to enlarge the entry section of the conveying channel which will receive the next bar segment.

In both embodiments of the invention, the blade holder drums 5, 6 are generally turned at a speed which is advantageously defined so that the horizontal component of the peripheral speed of the blades in all points in contact with the rolled bar to be cut is always faster than the speed of the bar itself, but is not excessive. The purpose of this is to avoid bending the head and tail of the product. Consequently, the peripheral speed of the blade holder drams may be quantified according to the laminated product, the geometry and the cutting job as sum of the rolling speed and an appropriately chosen, variable cutting overspeed within a limited tolerance to avoid tractions or jamming of the bar in transit.

A cutting speed compatible with the cutting dynamic itself and the required cutting length must be identified to obtain the required cutting length, the number of blades on the drum being integer and the pitch of the blades being fixed. Such a choice is determined also by the fact that any type of rephasing or swinging, sometimes used to limit the cutting length error, is prevented by the short times (e.g. 0.9 seconds between one cut and the next) and by the machine inertia (high because of its size).

Considering this aspect, a solution in which all the size cutting blades 7 and also all the head and tail scrapping or trimming blades 7', 7" (included in the second embodiment) are phased, i.e. have the same angular positions. This allows to treat the first and the last cut (head and tail) as all the intermediate size cuts, and does not require phase variations of the blade holder drums with respect to the advancing rolled bar.

In both embodiments of the invention, the switching device 2 is actuated by a motor, preferably a linear motor 21, which is better in terms of dynamic accuracy and in terms of cycle flexibility. In order to exploit the features of marketed linear motors effectively, the suggested kinematic diagram is to arrange the linear motor 21 with sliding axis parallel to the rolling axis and to connect the linear motor 21 to the switching device 2 by means of an intermediate connecting rod 20. This solution allows to introduce a transmission ratio sufficient to reduce the forces required on the motor, without compromising the dynamic performance of the switching device.

With reference to the second embodiment of the invention, the switching device 2 is configured to be positioned in at least four positions, allowing to set up scrapping (channels 12 and 13) during the transit of the bar on both grooves 40, 40' (corresponding to channels 10 and 11), without, making the rolled bar transit under the size cutting blades 7.

In general, the switching device 2 moves the rolled bar rightwards and leftwards to size cut bar segments: passing from groove 40', corresponding to channel 10, to groove 40, corresponding to channel 11, and vice versa, the rolled bar is size cut by the blades 7 (FIGS. 2 and 3 partially show only the lower drum 6 and the initial part of the conveying device 4) which act in an intermediate position between the grooves 40, 40', producing size cut bar segments, which are addressed alternatively into channels 10 and 11.

In case of emergency or when the tail or head of the rolled bar need to be cut, a scrapping cut is performed using a pair of outer scrapping blades 7' or 7". If the rolled bar is running in the channel 10, the switching device 2 moves the rolled bar towards the blades 7' and thus towards the conveying channel 12 (on the left in FIG. 2 or 3); while if the rolled bar is running in the channel 11, the switching device 2 moves the rolled bar towards the blades 7" and thus towards the conveying channel 13 (on the right in FIG. 2 or 3).

FIGS. 2 and 3 show a moment in which the rolled bar crosses the shear 3 towards the conveying channel 10 and a moment in which it crosses the shear 3 towards the conveying channel 11, respectively. By comparing FIGS. 2 and 3, it is apparent that moveable separation walls 8, 8', 8" are provided and arranged differently according to whether the bar is addressed towards channel 10 or towards channel 11. In particular, it is apparent that they are oriented so as to enlarge the entry selection of the channel in which the new bar segment will go. In FIG. 2, in which the bar is addressed towards the channel 10, the moveable walls 8, 8',8" are oriented so that the respective entries of channel 11 and channel 12 are widened. In FIG. 3, instead, in which the bar is addressed towards the channel 11, the moveable walls 8, 8', 8" are oriented differently so that the respective entries of channel 10 and channel 13 are widened.

Advantageously, the moveable separation walls 8, 8', 8" are connected to one another so that their movements are simultaneous and are correlated to the switching device 2 for optimizing their position changing movement.

A further aspect of the present invention relates to a size cutting process of a rolled bar using one of the embodiments of the cutting machine described above. Such a cutting process includes the following steps:

provinding a first head of a rolled bar advancing in the conveying channel 10;

performing a first switching of the rolled bar, by means of the switching device 2, from a first direction towards the conveying channel 10 to a second direction towards a second conveying channel 11;

performing a first size cut of the rolled bar at the blades 7 of the cutting shear 3 in the passage from said first direction to said second direction, thus defining a first bar segment 30 and a second head of the rolled bar;

wherein, after the first size cut, the tail of the first bar segment 30 advances in the conveying channel 10 by passing below a fixed partition 9, while the second head of the rolled bar advances in the conveying channel 11 by passing above said fixed partition 9.

Then, during the advancement of the second head of the roiled bar in the conveying channel 11, a second diversion of the rolled bar is carried out from said second direction to said first direction and a second size cut of the rolled bar at the blades 7 in the passage from said second direction to said first direction is carried out, defining a second bar segment 31 and a third head of the roiled bar.

After the second size cut, the tail of the second bar segment 31 advances in the conveying channel 11 by passing below the fixed partition 9, while the third head of the roiled bar advances in the conveying channel 10 by passing above said fixed partition 9.

More in detail, FIG. 4 shows the passage from channel 10 to channel 11. The rolled bar 50 is crossing channel 10 resting on the base surface of said channel 10, in position A, as shown in the lateral view of FIG. 6b.

When the switching device 2 starts moving rightwards to reach the direction towards the channel 11, the rolled bar 50 remains resting on the base surface of the channel 10 and is inserted in the first cavity of the fixed T-shaped partition 9, i.e. below the left portion of the bulkhead 16 in a space delimited to the right of the bulkhead 15 (position B).

Having reached the central part of the partition 9, the rolled bar is also at the size cutting blades 7, and thus will be cut, with the tail of the first bar segment 30 which proceeds in channel 10.

Figure 6B:
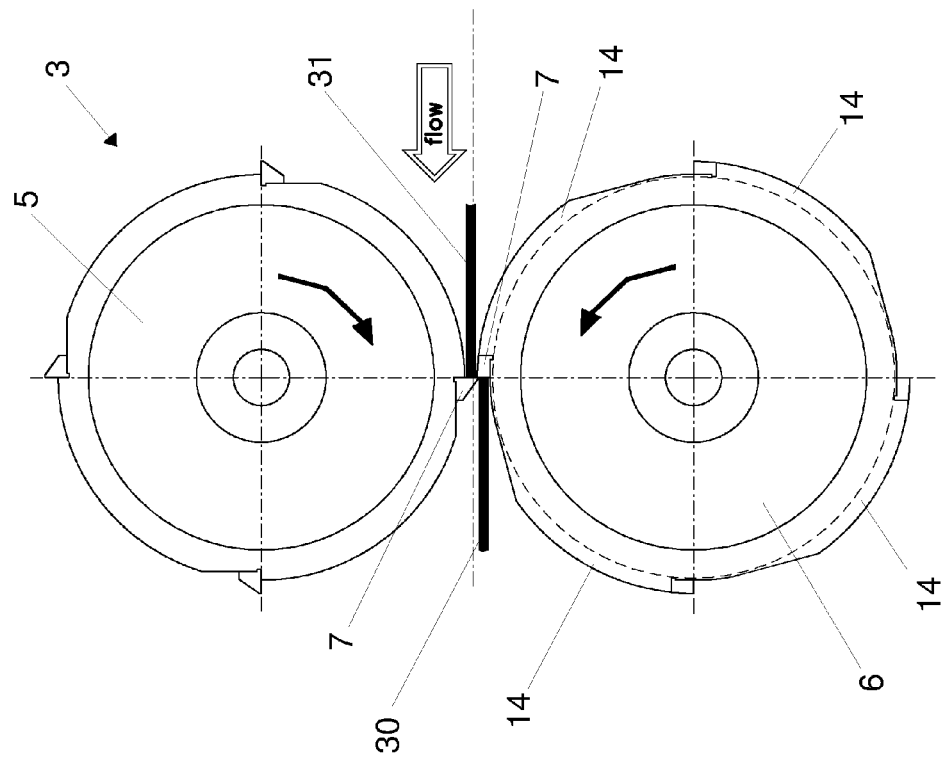
FIGS. 6a and 6b show two steps of the passage of the rolled product through a cutting shear.
Figure 6A:
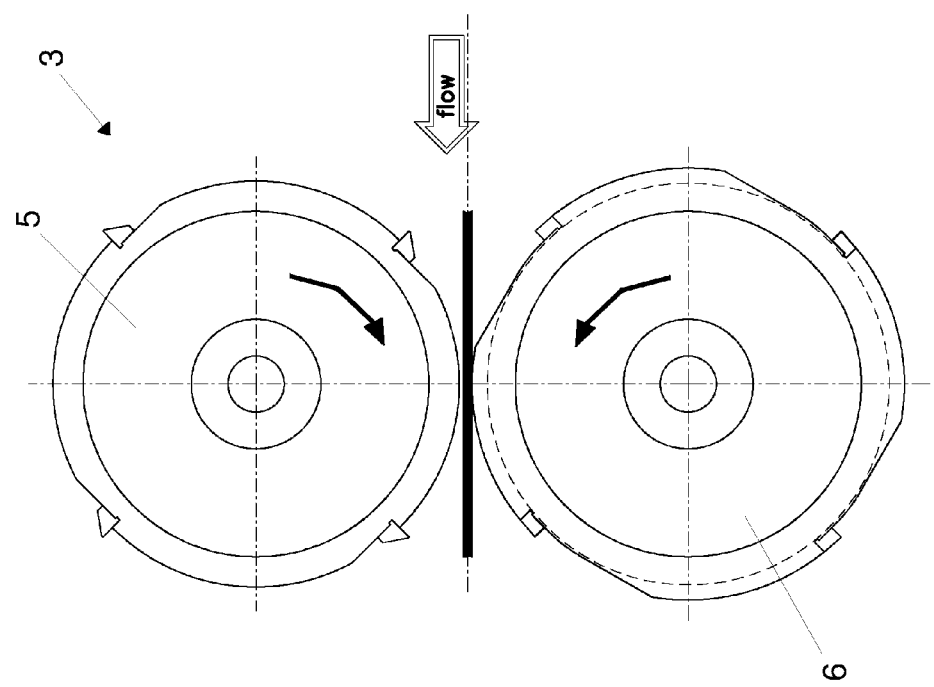

As shown in FIG. 6b, by cutting the roiled bar, due to the arrangement of the blades 7, the tail of the first bar segment 30 is kept low, while the new head of the rolled bar is lifted, which will be the head of the next bar segment 31, by virtue of the presence of the switching earn 14 on the lower drum 6, near the blade 7.

The new head 51 (FIG. 4) of the rolled bar, in addition to being carried rightwards by the movement of the switching device 2, is thus also lifted; in this manner, it passes again on the upper part of the partition 9, i.e. over the bulkhead 16 (position C), on which the moveable wall 8 is present, already arranged so as to convey the new head 51 towards the channel 11 also if it does not have time to move rightwards sufficiently.

Continuing the side rightwards movement, the new head 51 of the rolled bar falls from the upper wall 16 of the partition 9 and reaches the base surface of the channel 11 (position E), i.e. the position in which it will run until the next cut.

Once the new head of the rolled bar has reached channel 11, the position of the moveable walls 8, 8', 8" may be modified so as to be ready to facilitate the channel at the next cut.

The passages described above with reference to FIG. 4 occur also for the movements of the bar from channel 11 to channel 13 and from channel 12 to channel 10.

Similarly, FIG. 5 shows the reverse passage from channel 11 to channel 10. The same movements shown in FIG. 5 occur in the passage of the bar from channel 13 to channel 11 and from channel 10 to channel 12.

The invention claimed is:

1. A conveying device for conveying rolled bar segments, continuously exiting from a cutting shear, comprising:
at least two conveying channels for conveying the rolled bar segments, the at least two conveying channels including a first conveying channel and a second conveying channel that are arranged next to one another and have a common base surface,
at least one separation wall for separating said first conveying channel from said second conveying channel, said at least one separation wall being substantially perpendicular to said common base surface,
and at least one fixed partition, provided adjacent to said at least one separation wall and between said at least one separation wall and said common base surface, which separates said first conveying channel from said second conveying channel, said at least one fixed partition having a first portion abutting the common base surface and a second horizontal portion affixed to the first portion that is substantially parallel to said common base surface and distanced from said common base surface, the first portion and the second horizontal portion defining two longitudinal cavities with the common base surface,
such that, at operating speed, when a rolled bar is deviated to pass from a direction towards the first conveying channel to a direction towards the second conveying channel, a tail of a first bar segment cut by the cutting shear advances in the first conveying channel by passing below said horizontal portion and through at least one of the longitudinal cavities while a head of a second bar segment cut after the first bar segment advances in the second conveying channel by passing above said horizontal portion of said at least one fixed partition and distanced from the common base surface.

2. A device according to claim 1, wherein said at least one fixed partition has a T-shaped cross section.

3. A device according to claim 2, wherein said at least one fixed partition is provided with the first portion defining a first bulkhead, which is transversal with respect to said base surface common to the first and to the second conveying channel, and with the second horizontal portion defining a second bulkhead arranged above, perpendicular to, and abutting said first bulkhead, whereby at speed the tail of the first bar segment advances in the first conveying channel by initially passing below said second bulkhead, while the head of the second bar segment advances in the second conveying channel by initially passing above said second bulkhead.

4. A device according to claim 3, wherein said at least one separation wall is rotatable in one direction or in the other above said second bulkhead so as to enlarge an entry section of one of the first and second conveying channels.

5. A device according to claim 1, wherein said at least one separation wall is movable.

6. A device according to claim 1, wherein four conveying channels are provided, separated by three separation walls and three corresponding fixed partitions.

7. A device according to claim 6, wherein a first separation wall and a respective first fixed partition separate the first conveying channel from the second conveying channel; wherein a second separation wall and a respective second fixed partition separate the first conveying channel from a third conveying channel for receiving bar segments to be scrapped; and wherein a third separation wall and a respective third fixed partition separate the second conveying channel from a fourth conveying channel for receiving further bar segments to be scrapped.

8. A device according to claim 1, wherein said at least one separation wall includes two or more separation walls arranged in a coplanar relationship, and said at least one fixed partition includes two or more fixed partitions arranged in a coplanar relationship parallel to said two or more separation walls.

9. A cutting machine for continuously cutting rolled bars, exiting from a rolling mill, into rolled bar segments, the machine comprising:
a conveying device according to claim 1;
a cutting shear for cutting a rolled bar into rolled bar segments;
a switching device for alternately switching a trajectory of the rolled bar to be cut from a direction towards a first conveying channel to a direction towards a second conveying channel.

10. A cutting machine according to claim 9, wherein the cutting shear comprises two contra-rotating drums equipped with at least one series of blades.

11. A cutting machine according to claim 10, wherein the two contra-rotating drums are equipped with three series of blades: one central series of blades for carrying out a size cut of the rolled bar segments and two side series of blades for carrying out a scrapping cut.

12. A cutting machine according to claim 11, wherein at each series of blades there are provided a respective separation wall and a respective fixed partition.

13. A cutting machine according to claim 11, wherein at least one of the two contra-rotating drums is equipped with at least two bladeless grooves corresponding to the at least two conveying channels.

* * * * *